United States Patent
Shimogama

[11] Patent Number: 5,903,123
[45] Date of Patent: May 11, 1999

[54] EMERGENCY STOP CIRCUIT FOR A ROBOT

[75] Inventor: Shigeru Shimogama, Kawanishi, Japan

[73] Assignee: Matsushita Electric Industrial Co., Ltd., Osaka, Japan

[21] Appl. No.: 09/018,399

[22] Filed: Feb. 4, 1998

[30] Foreign Application Priority Data

Feb. 7, 1997 [JP] Japan ................................ 9-024906

[51] Int. Cl.⁶ ............................................... G05B 9/02
[52] U.S. Cl. ................. 318/568.13; 901/49; 318/568.11; 318/563
[58] Field of Search ........................ 318/563, 564, 318/568.24, 434; 361/23–31; 901/49, 50, 3, 8, 46

[56] References Cited

U.S. PATENT DOCUMENTS

| | | | |
|---|---|---|---|
| 4,187,454 | 2/1980 | Ito et al. | 318/568.14 |
| 4,406,576 | 9/1983 | Inaba et al. | 414/735 |
| 4,491,718 | 1/1985 | Cook et al. | 219/124.22 |
| 5,115,179 | 5/1992 | Fujii et al. | 318/568.13 |
| 5,212,433 | 5/1993 | Yasuyuki | 318/568.13 |
| 5,444,342 | 8/1995 | Matsuo et al. | 318/563 |
| 5,497,057 | 3/1996 | Danielson et al. | 318/371 |
| 5,615,469 | 4/1997 | Jensen et al. | 29/426.5 |

FOREIGN PATENT DOCUMENTS

| | | |
|---|---|---|
| 170705 | 2/1986 | European Pat. Off. . |
| 3444218 | 7/1986 | Germany . |
| 6-38334 | 5/1994 | Japan . |

*Primary Examiner*—Jonathan Wysocki
*Attorney, Agent, or Firm*—Pearne, Gordon, McCoy & Granger LLP

[57] ABSTRACT

First ends of electrical elements (CR18, CR14, CR17, CR16) forming safety circuits are electrically grounded, and safety circuits (switches 105, 103, 104, 107) are connected between the remaining second ends of the electrical elements and the power supply side (positive (+) side) of the system thereof, so that even if a signal transmitting line in the safety circuit system is grounded, the safety system relay is not excited; that is, it is kept opened, thereby to interrupt of the servo power supply circuit. Further, two relays of hardware system and of software system are provided which transmits an emergency stop state or other abnormal state to the outside. The relay contact means of the two relays are extended outside, so that it is detected with an external control board whether the relays are opened or closed, thereby to detect whether or not the contact means are fused.

5 Claims, 4 Drawing Sheets

EMERGENCY STOP CIRCUIT FOR A ROBOT

BACKGROUND OF THE INVENTION

This invention relates to a safety device for a robot, which maintains an input-output circuit high in reliability which is to externally control a robot body.

In general, an industrial robot in a teaching play-back system employs a teach pendant (TP). The teach pendant (TP) is useful for teaching the robot when the operator finely moves robot body watching a controlled point (end effector) of the industrial robot.

The teach pendant (TP) has an emergency stop switch to secure the operator from danger. The emergency stop switch is electrically series-connected to an emergency stop circuit. Therefore, when the switch is operated, a servo power supply for driving a robot body is turned off.

The servo power supply for driving a robot body is provided with safety circuits such as a door stop detection circuit and an external emergency stop circuit, so that the servo power supply is turned off when a door stop input or an external emergency stop input is applied.

When the robot operator operates the emergency stop switch of the teach pendant (TP), or when he operates the door stop input circuit or the external emergency stop circuit in the safety circuit, the servo power supply for driving a motor of an industrial robot is turned off, and the lock (brake) of the shaft of the servo motor is operated.

Now, a conventional industrial robot safety device will be described with reference to FIG. 4.

If, when a panel/external service "on" switch 110 is closed, there is no factor (the emergency stop circuit input signal such as the door stop input signal, the external emergency stop signal) which interrupts the application of servo power to the robot body, then a CPU (not shown) fixes a CPU servo power supply ON output signal at HIGH logic level with the aid of a flip-flop circuit (not shown). In this case, relay coils CR18, CR14, CR17, and CR16 have been excited; that is, their relay contact means CR18a, CR14a, CR17a and CR16a have been closed. Hence, a voltage (+24VDC in the case of FIG. 4) is induced on a servo application permission signal line 12, so that the servo power application circuit is driven.

As shown in FIG. 2, the robot body 1 is set in a safety cage 2 at all times, and the safety fence has a door 5 through which the operator goes in and out of the cage. When the door 5 is opened, a door stop input switch 105 is operated. When the switch contact means is opened, of the door stop input signal is interrupted, and a contact means 105b is opened which are connected to the door stop input line 105a and a circuit ground (PG). Therefore, the CPU recognizes the door stop input signal operation with the aid of a photo-coupler group 22, while the relay CR16 is deexcited, and the contact means CR16a is opened, so that the servo supply is turned off.

As is apparent from the above description, the door stop input switch 105 and other emergency stop circuits (a TP emergency stop input switch 104, an external stop input switch 103, and a panel emergency stop input switch 107) excite the relay coils CR16, CR14, CR17 and CR18 of the emergency stop circuits, thereby to series-connect their relay contact means to the servo application permission signal line 12 as shown in FIG. 4. Therefore, if any one of the external input signals (no voltage switch) of the safety circuits is turned off, the servo application permission signal line 12 is interrupted, thereby to turn off the servo supply.

In the case where the various emergency stop circuits operate to interrupt the servo application permission signal line 12 of the robot body 1, or the CPU in the robot control device 3 recognizes the aforementioned operations or other abnormal states, the CPU emergency stop output signal 11 is fixed at LOW logical level with the aid of a flip-flop circuit (not shown). Therefore, in this case, the relay CR1 is deexcited, so that the relay contact means CR1a is opened to inform external equipments of the emergency stop state.

When the work preparation of the robot body 1 has been accomplished, the robot control device 3 applies a general purpose output n 106a to an external control board 6. In response to the general purpose output n 106a, the external control board 6 operates a workpiece supply device 8 to supply a workpiece into the operating range of the robot body 1. Upon completion of the supply of a workpiece, the external control board 6 causes a general purpose input 106g to short-circuit with a circuit ground 106h thereby to apply a signal to the robot control device 3. In response to the input signal, the robot control device 3 starts control to cause the robot body 1 to perform a predetermined operation (work). As is apparent from the above description, the robot body 1 and the workpiece supply device cooperate with each other to perform a series of work. For this purpose, the robot control device 3 are provided with general purpose input n (n being natural numbers) and general purpose output n (n being natural numbers) to transmit signals between itself 3 and the external control board 6.

As was described above, in the conventional industrial robot safety device, the servo power supply circuit of the robot is interrupted by using the limit switch or the relay contact means—for instance by operating the emergency stop input switch 104 of the teach pendant (TP) 4 to open the switch contact means. In order to turn on or off the servo power supply, the switch or the relay contact means is operated. Therefore, if the driven line (105a, 103a, 104a, 107a, 110a, 106g, or 106b) in the group 21 of wires is grounded which is connected between the switch and the input and output sections in the robot control device 3, the variety of emergency stop signals, and the operation of the general purpose input signal n, or the general purpose output signal n is not correctly transmitted, so that the predetermined functions are not correctly performed.

Furthermore, in the case where the relay contact means CR1a indicating the emergency stop output is fused, the input and output signals are not correctly transmitted. In addition, since the contact means should function as a no-voltage contact means, it is impossible for the side of the robot control device 3 to detect that the contact means has been fused.

SUMMARY OF THE INVENTION

Accordingly, an object of the invention is to provide an industrial robot safety device in which, in view of the fact that recently the consciousness of safety has been greatly increased—the safety device has been standardized, the input and output signals from the robot control device 3 are improved in reliability, and which makes the operation of the robot more positive in safety.

According to the present invention, a safety device for a robot comprises a servo application permission signal line which controls "on and off" states of a servo power supply for driving the robot, switching elements provided on the servo application permission signal line, and emergency stop circuit for driving the switching elements, wherein first ends of switches adapted to operate the emergency stop circuits are connected to a positive side of a power supply, the remaining second ends of the switches of the emergency stop circuits are connected to first ends of the switching elements adapted to control "on and off" states of the servo power supply, and the remain second end of the switching elements are grounded.

Further, according to the present invention, a safety device for a robot, comprises a servo application permission signal line which controls "on and off" states of a servo power supply for driving the robot, a first relay of normally open type, a first end of which is connected to the servo application permission signal line, a second relay of normally open type, a first end of which is connected to the servo application permission signal line, wherein a relay contact means of the second relay is provided between the remaining second end of the first relay and ground, and an emergency stop output signal is applied to the remaining second end of the second relay.

Furthermore, according to the present invention, in a robot safety device as mentioned above, wherein the second relay is a normally closed type relay having a plurality of relay contact means, and a relay contact means of the first relay and a relay contact means of the second relay are connected to the output side, and outputs thereof are utilized to detect whether or not the relay contact means are fused.

Moreover, a robot safety device as mentioned above, further comprises an original power supply device provided to supply electric power to the servo application permission signal line, and a fuse provided between the original power supply device and the servo application permission line.

The robot safety device of the invention is designed as described above. Hence, when the switch of the emergency stop circuit, which emergency-stops in response to the operation of a door stop or an emergency stop means, is grounded, no current flows in the switching elements on the servo application permission signal line. Therefore, the servo power supply can be positively turned off, and at the same time the supplying of the safety system circuit operating power supply can be suspended.

Furthermore, it can be externally detected whether or not the emergency stop output transmitting relay contact means are fused. This feature improves the safety device in reliability and safety.

DETAILED DESCRIPTION OF PREFERRED EMBODIMENTS

One preferred embodiment of the invention will be described with reference to FIGS. 1, 2 and 3.

Figure 2:
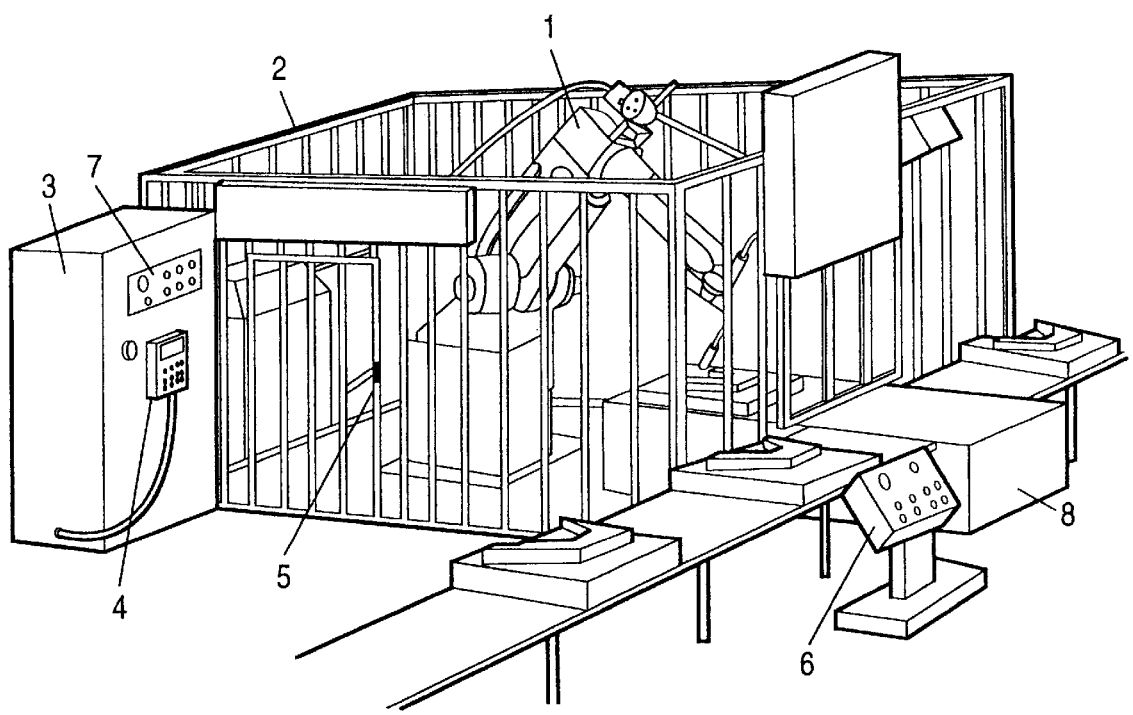
FIG. 2 is a perspective view of a robot system.

As shown in FIG. 2, a robot body 1 is arranged in side a safety cage 2, and a robot control device 3 and other devices are arranged outside of the safety cage 2. In order to teach the order of operations which the robot should perform, the operator opens a door 5 and enters the safety cage 2 with a teach pendant 4 held in his hand.

In the case of a robot of teaching play-back system, by continuously depressing a TP dead man switch (not shown) of the teaching pendant 4, a servo power supply for driving the robot body 1 is kept turned on, and by depressing the movable key switches of the axes provided on the teach pendant 4 the robot body 1 is moved, and the end effector are moved in the order of operations which the robot should perform. And for every position, and for every teach point, input and output instructions etc. necessary for the workpiece supplying operation of a work supplying device 8 are given.

On the front panel 7 of the robot control device 3, a button type switch 110 is provided for turning on the servo power supply. That is, with the switch 110, the servo power supply for driving the servo motor of the robot body 1 can be turned on. In addition, a switch (not shown) for starting the operation of the robot body, and other switches are provided on the front panel.

An external control board 6 is operated to turn on and off a primary supply power source which is applied to the robot system, and to apply servo power supply to the robot body 1, and to select an operating mode, and to select a program which has been taught. Furthermore, when an operation is started according to the selected program, or the operation is performed according to the selected program, the external control board 6 is able to transmit general purpose input and output to the robot control device or receive them from the latter.

Next, an industrial robot safety device, the embodiment of the invention, will be described.

Figure 1:
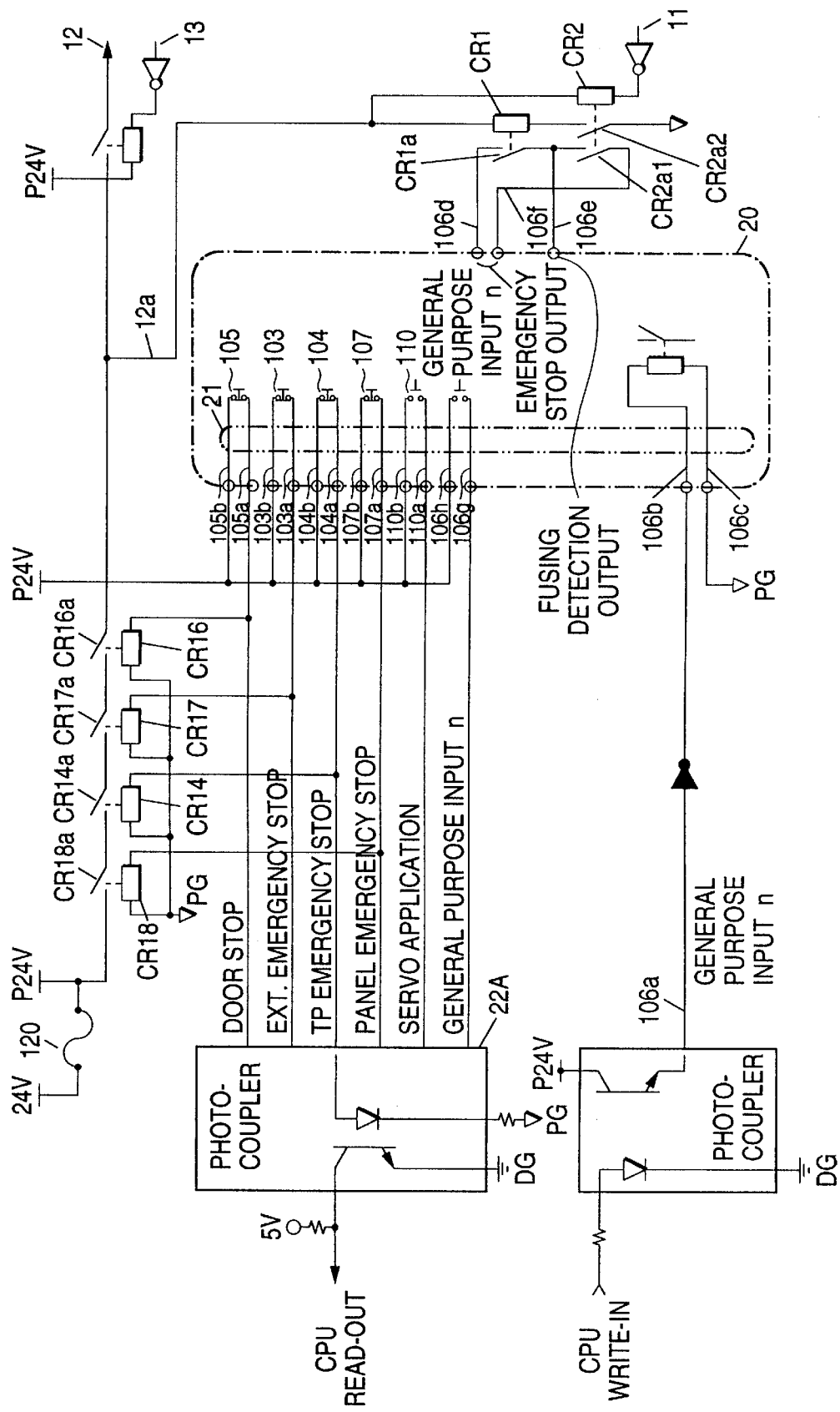
FIG. 1 is a circuit diagram showing a robot safety device, which constitutes a preferred embodiment of the invention.

The safety device shown in FIG. 1 is different from the conventional one in the following points: First ends (105b, 103b, 104b, 107b, 110b, 106h and 106b) of electrical elements (such as switches and relays) which are connected to one another with connecting wires 21 to the positive (+) side of a circuit driving control power supply in the safety device. And, in the robot control device 3, the contact means of a hardware system emergency stop line and the contact means of a software system emergency stop line are directly connected to each other to provide an emergency stop output contact means, and then both ends 106d and 106f thereof, and the connecting point 106e of those two relay contact means are supplied outside of the robot control device. Furthermore, the robot control device 3 has safety switch input sections for emergency stop, and the safety switch input sections are made up of positive type switches. A specific feature of the push-cut type switches resides in that, when the operator presses the switch section, the open or closed state of the contact means can be changed without fail, and that the switch is free from the problem that the contact means is fused.

Now, the operation of the safety device will be described.

The switches on the external control boards 6 are connected to the input and output sections of the robot control device 3 with the connecting wires 21. In the case when the lines 105a, 103a, 104a and 107a of the connecting wires 21 are grounded, first ends of the relays CR16, CR17, CR14 and CR18 corresponding to the lines are grounded; however, the relays are not excited because second ends (the other ends) of the relays are connected to the ground side of the input and output control power supply. Hence, the relay contact means CR16a, CR17a, CR14a and CR18a are opened, and therefore a voltage (P24V) is not produced on the line of a serve application permission signal 12, and no servo power supply is applied to the robot body 1. On the other hand, in the case when the lines 105b, 103b, 104b and 107b of the connecting wires 21 are grounded, since the signal lines are connected to the positive (+) side of the input and output section control power supply, an over-current flows from a original power source 24V to the control power source P24V, so that a fuse 120 is blown out; that is, the input and output section control power supply P24V is eliminated. Hence, similarly, the voltage (P24V) is not developed on the line of the servo application permission signal 12, and no servo power supply is applied to the robot body 1.

Next, in the case where the input signal lines 110a and 106g of the connecting wires 21 are grounded, since the input signal lines of a panel/external servo application 110 switch input signal and the general purpose input signal n are connected to the anodes of photo-diodes in a group 22A of photo-couplers, and the cathodes of the photo-diodes are connected to the ground side of the input and output section control power supply the difficulty is eliminated that the CPU reads those input signals by mistake. In the case where the input signal lines 110b and 106h of the connecting wires 21 are grounded, since those signal lines are connected to the positive (+) side of the input and output section control power supply a current flows from the original power source 24V to the control power source P24V, so that the fuse 120 is blown out; that is, the input and output section control power source P24V is eliminated. Hence, similarly, the voltage (P24V in the case of FIG. 1) is not developed on the servo application permission signal line 12, and no servo power supply is applied to the robot body 1.

In the case where the signal line 106c of the general purpose output n of the connecting wires 21 is ground, since it is connected to the ground side of the input and output section control power supply the problem is eliminated that electrical elements connected to the general purpose output operate erroneously. In the case where the line 106b of the general purpose output n of the connecting wires 21 is grounded, and in the case where the line 106a is at HIGH logical level, so that an over-current flows in the line 106b, the circuit system ground is low in impedance. Therefore, no current flows to the electrical elements connected to the general purpose output n, and the fuse 120 is brown out; that is, the input and output section control power supply P24V is eliminated. Therefore, similarly, the voltage (P24V in the case of FIG. 1) is not developed on the servo application permission signal line 12, and no servo power supply is applied to the robot body 1.

Now, an emergency stop output will be described which is to inform the outside of the fact that the robot control 3 is in emergency stop state. This output is provided through no voltage contacts, and must be a B contact (break contact) output. Therefore, because of the circuit arrangement, relays CR1 and CR2 are A contact (make contact) output relays. In the case where the emergency stop switches 105, 103, 104 and 107 have been closed, a voltage is developed on the line 12a, and this state can be recognized through a photo-coupler group 22A, and therefore a flip-flop circuit (not shown) fixedly holds the CPU emergency stop output signal 11 at HIGH logic level. Hence, the relay CR2 is excited, and the relay contact means CR2a1 and CR2a2 thereof are held closed. Since the relay contact means CR2a2 has been closed, the relay CR1 is also excited, so that the relay contact means CR1a is also closed. Hence, in this case, the emergency stop output is such that the contact means are closed.

Next, in the case where one of the emergency stop switches 105, 103, 104 and 107 is operated, one of the relay contact means CR16a, CR17a, CR14a and CR18a is opened. Hence, the voltage on the line 12a is eliminated, and the relays CR1 and CR2 are deexcited, so that the relay contact means CR1a, CR2a1 and CR2a2 are opened. Hence, in this case, the emergency stop output is such that the contact means are opened.

Next, the case where none of the emergency stop switch 105, 103, 104 and 107 is operated will be described. In the case where, although the voltage is developed on the line 12a, the CPU recognizes some abnormal condition, the CPU emergency stop output signal 11 is fixedly held at LOW logic level by a flip-flop circuit (not shown). As a result, the relay CR2 is deexcited, while the relay contact means CR2a1 and CR2a2 are opened, so that the relay CR1 is also deexcited, and its relay contact means CR1a is opened. Accordingly, in this case, the emergency stop output is such that the contact means are opened.

In this connection, when the open or closed state of the relay contact means CR1a is equal to that of the relay contact means CR2a1 or vice versa, it is determined normal; if not, it is determined that one of the contact means has been fused.

Figure 3:
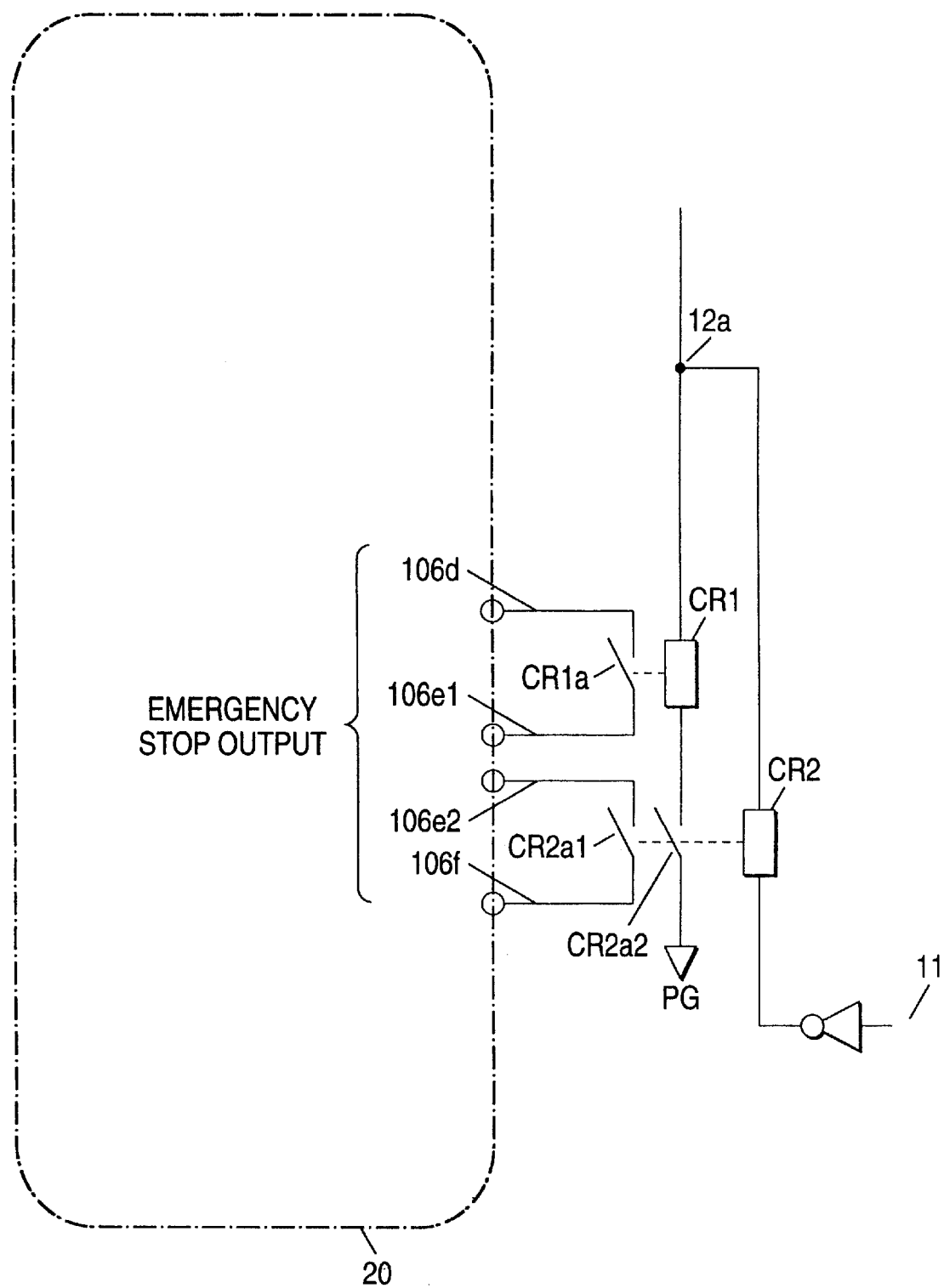
FIG. 3 is a circuit diagram showing essential parts of the robot safety device, the embodiment of the invention.
Figure 4:
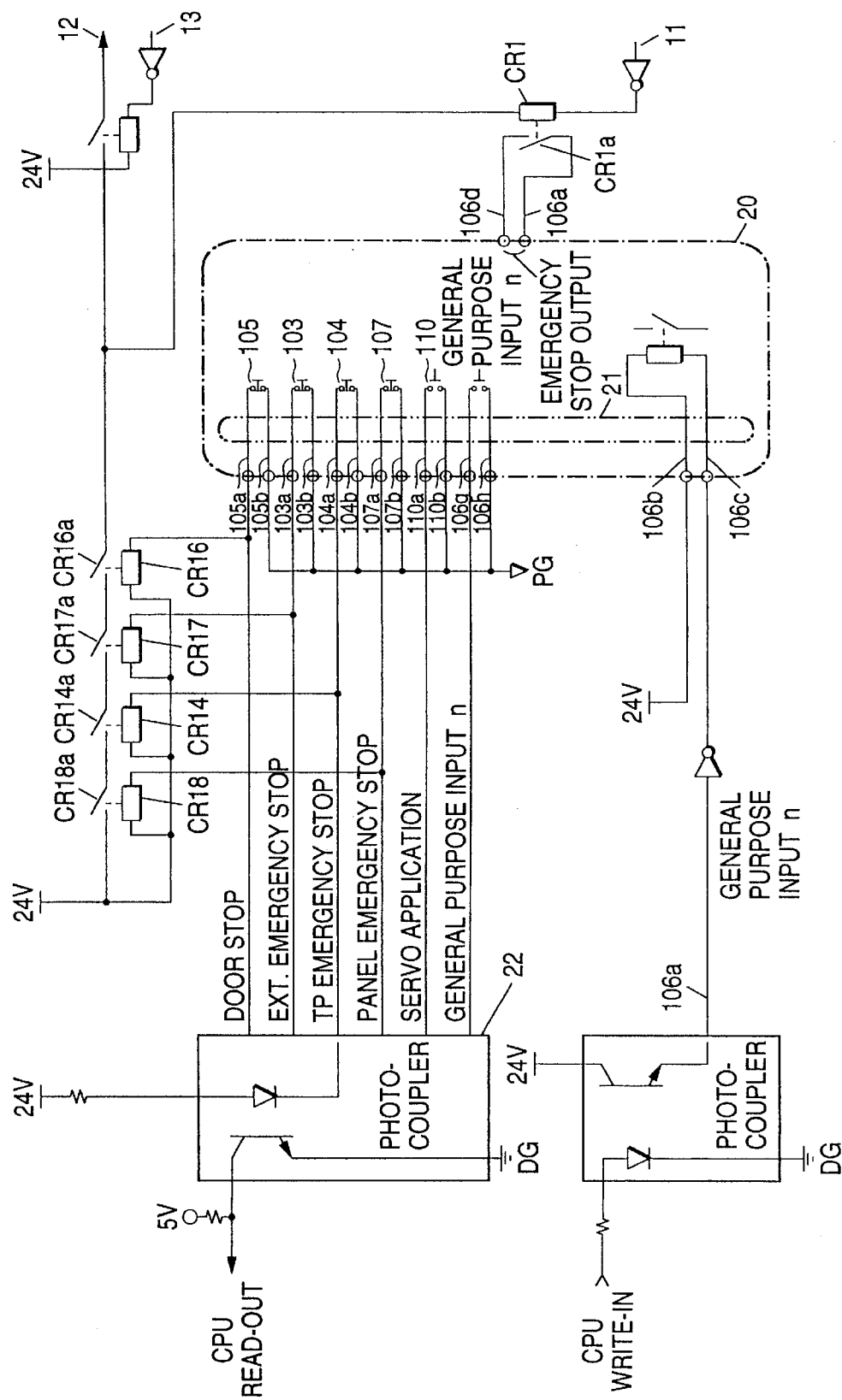
FIG. 4 is a circuit diagram showing a conventional robot safety device.

The above-described emergency stop output may be modified as shown in FIG. 3 in which only essential elements are shown.

In the above-described embodiment, the switching elements on the servo application permission signal line 12 are the relays; however, the invention is not limited thereto or thereby. That is, the same effects may be obtained by employing other switching elements such as photo-couplers and transistors.

As is apparent from the above description, in the robot safety device of the invention, the first ends of the signal transmitting electrical elements (such as relays and photo-couplers) are electrically grounded, and switches are connected between the remaining second ends of the electrical elements and the positive (+) side of the power supply of the system thereof. Therefore, even if the emergency stop circuit system's signal transmitting line 21 is grounded, the relays are not excited; that is, they are opened to positively interrupt the servo power supply circuit.

In the safety device of the invention, in order to output an signal representing the emergency stop state or other abnormal states which the robot has detected, two relays are provided. The first ends of the relay contact means are connected together, and the connecting points of the relay contact means and the remaining second ends are extended outside, so that it is externally detected with the external control board whether or not any one of the relay contact means has been fused. In general, when, in the case where particularly a DC voltage is applied with the relay contact means held closed, the relay contact means is about to open, the contact means is liable to be fused because of the transition phenomenon; however, since the relay contact means are connected as described above, the transition phenomenon scarcely occurs. Furthermore, in the safety device of the invention, in order to prevent the original power supply from damage when the lines connected to the safety device switches or the like are grounded, the fuses are connected between the safety device power supply and the original power supply. Therefore, even if the grounding phenomenon occurs, the respective fuse is blown out, to protect the original power supply from damage.

As was described above, according to the invention, even if the safety signal transmitting line is grounded, the fuse is blown out to interrupt the safety circuit operating power supply circuit, and to positively interrupt the robot body driving servo power supply circuit. In addition, it can be detected whether or not the emergency stop output transmitting relay contact means are fused. Hence, the robot safety device of the invention is more positive in reliability and in safety than the conventional one.

What is claimed is:

1. A safety device for a robot comprising:

a servo application permission signal line (12) which controls "on and off" states of a servo power supply for driving the robot;

switching elements (CR18, CR14, CR17, CR16) provided on said servo application permission signal line (12), each of said switching elements having a first end and a second end; and an emergency stop circuit (20) for driving said switching elements, said emergency stop circuit comprising a plurality of switches (105, 103, 104, 107), said switches having first ends (105b, 103b, 104b, 107b) connected to a positive side (P24V) of the control power supply of emergency stop system and second ends (105a, 103a, 104a, 107a) connected to first ends of said switching elements (CR18, CR14, CR17, CR16), the second ends of said switching elements being grounded.

2. A robot safety device as claimed in claim 1, further comprising:

an original power supply device (24V) provided to supply electric power to said servo application permission signal line; and a fuse (120) disposed between said original power supply device and said servo application permission line.

3. A safety device for a robot, comprising:

a servo application permission signal line (12) which controls "on and off" states of a servo power supply for driving the robot;

a first relay (CR1) of a normally open type, said first relay having a first end which is connected to said servo application permission signal line (12);

a second relay (CR2) of a normally open type, said second relay having a first end which is connected to said servo application permission signal line (12);

wherein a relay contact means (CR2a2) of said second relay (CR2) is provided between a second end of said first relay (CR1) and ground, and an emergency stop output signal is applied to a second end of said second relay (CR2).

4. A robot safety device as claimed in claim 3, wherein said second relay (CR2) is a normally open type relay having a plurality of relay contact means (CR2a1, CR2a2), and a relay contact means (CR1a) of said first relay (CR1) and a relay contact means (CR2a1) of said second relay (CR2) are connected to an output side and are utilized to detect whether said relay contact means are fused.

5. A robot safety device as claimed in claim 3, further comprising:

an original power supply device (24V) provided to supply electric power to said servo application permission signal line; and a fuse (120) disposed between said original power supply device and said servo application permission signal line.

* * * * *